United States Patent Office 3,255,147
Patented June 7, 1966

3,255,147
COMPOSITIONS COMPRISING A CARBOXYLIC ACID AMIDE INTERPOLYMER AND A POLY-ALKYLENE ETHER
Robert C. Krueger, Whitefish Bay, and Erwin J. Kapalko, Muskego, Wis., assignors to Pittsburgh Plate Glass Company, Pittsburgh, Pa., a corporation of Pennsylvania
No Drawing. Filed Apr. 25, 1961, Ser. No. 105,279
10 Claims. (Cl. 260—33.2)

This invention relates to resinous compositions and more particularly it relates to blends of (1) an aldehyde-modified unsaturated carboxylic acid amide interpolymer and (2) a polyalkylene ether of certain hydroxyl or amine substituted compounds.

In a copending application, Serial No. 749,583, filed July 21, 1958, now U.S. Patent No. 3,037,963, there is disclosed a process for producing useful resinous products from unsaturated carboxylic acid amides such as acrylamide or methacrylamide. The process disclosed in said copending application involves forming an interpolymer of such unsaturated carboxylic acid amides with at least one other polymerizable ethylenically unsaturated monomer, and then reacting said interpolymer with an aldehyde such as formaldehyde in the presence of an alcohol such as butanol. The resulting resins range from soft, flexible materials to very hard solids, depending upon the choice of monomers utilized in preparing the amide interpolymer which in turn is reacted with the aldehyde and the alcohol.

The resins prepared in accordance with the method described in said copending application, Serial No. 749,583, are useful in coating compositions, laminates, and the like, particularly when blended with one or more other resinous materials such as epoxide resins, vinyl resins, amine resins, alkyd resins, nitrocellulose, polyethylene, and the like. Such resinous blends form films with excellent flexibility, recoat adhesion, and freedom from undesirable color formation, even on overbaking of the film. These films are also outstanding in appearance, gloss, adhesion, mar resistance, color retention, moisture resistance, stain resistance, grease resistance, heat resistance, detergent resistance, and corrosion resistance. Moreover, these outstanding properties are often obtained in a single coating composition of the resinous coating composition on a metallic surface, whereas previous coating compositions have almost without exception required the use of one or more so-called "primer" coats.

The outstanding properties set forth in the foregoing paragraph render the aldehyde-modified amide interpolymer coating compositions useful as finishes for appliances, such as ranges, refrigerators, air conditioners, washers, water heaters, as well as finishes for steel building panels and aluminum siding, and in fact as general industrial finishes on solid surfaces, such as metals, plastics, wallboard, and the like. Such compositions have met with wide commercial acceptance throughout the world.

In many of the above-mentioned areas of utility it has been desirable to employ a certain amount of plasticizer with the carboxylic acid amide interpolymer compositions, especially where stringent flexibility requirements exist. It has been found, however, that many of the well-known plasticizers cannot be used with the aldehyde-modified unsaturated carboxylic acid amide interpolymers for one reason or another. The chemical plasticizers such as the sebacates, and the phosphates exude or "sweat out" of the film of coating on aging. Moreover, this type of plasticizer, together with the non-drying type vegetable oils, migrate readily into more thermoplastic type resins such as polyvinyl chloride, or polystyrene. This occurs readily in a multi-layer coating system wherein a polyvinyl chloride film is placed or superimposed upon the aldehyde-modified unsaturated carboxylic acid amide interpolymer composition film.

It has also been found that many of the desirable physical properties of these aldehyde-modified unsaturated carboxylic acid amide interpolymer resinous compositions are destroyed through the use of various plasticizers. Detergent resistance, humidity resistance and resistance to salt spray are significantly reduced when many of the well known plasticizers are added to these resinous compositions, especially those of the chemical type.

It has now been discovered that most of these undesirable effects do not occur when certain polyalkylene oxide reaction products are employed as plasticizers with the said aldehyde-modified unsaturated carboxylic acid amide interpolymers. The polyalkylene oxide reaction products are outstanding plasticizers for the said aldehyde-modified interpolymers since they do not exrude or migrate under the most severe circumstances, even when kept at sustained high temperatures and may be used in large amounts (up to 30 percent) without any apparent change in properties. At the same time their plasticizing action enables blends of said plasticizers with the said aldehyde-modified carboxylic acid amide interpolymers to pass the most rigid flexibility tests. Moreover, their presence in the said aldehyde-modified interpolymer resinous compositions does not significantly reduce the outstanding qualities or properties existing inherently in these resinous compositions, such as, for example, their detergent resistance, humidity resistance, resistance to color change on overbake, resistance to salt spray, mar resistance, color retention, adhesion, etc.

In the preparation of the aldehyde-modified amide interpolymer resin a polymerizable unsaturated carboxylic acid amide is polymerized with one or more ethylenically unsaturated monomers, and the resulting interpolymer reacted with an aldehyde. The exact mechanism whereby the amide interpolymers are obtained is not definitely known, but is believed to begin by the formation initially of a relatively short chain soluble interpolymer having an approximate structure as follows, acrylamide being utilized for illustrative purposes:

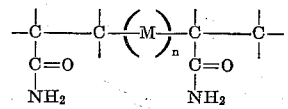

wherein M represents a unit of a monomer polymerizable with acrylamide, and n represents a whole number greater than 1. For example, if styrene were utilized as the second monomer, M would represent the unit

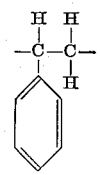

The short chain interpolymer then reacts with an aldehyde, as represented by formaldehyde, to give the structure

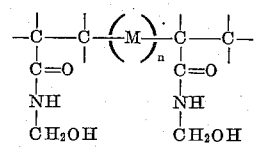

wherein M and n have the significance set forth hereinabove.

In the event the aldehyde is utilized in the form of a solution in butanol or other alkanol, etherification will take place so that at least some of the methylol groups in the above structure will be converted to groups of the structure

wherein R is selected from the class consisting of hydrogen and a saturated lower aliphatic hydrocarbon radical having its free valences on a single carbon atom, and $R_1$ is a member of the class consisting of hydrogen and the radical derived by removing the hydroxyl group from the alkanol utilized.

It is desirable that at least about 50 percent of the methylol groups be etherified since compositions having less than about 50 percent of the methylol groups etherified will tend to be unstable and subject to gelation. Butanol is the preferred alcohol for use in the etherification process, although any alcohol, such as methanol, ethanol, propanol, pentanol, octanol, decanol, and other alkanols containing up to about 20 carbon atoms may also be employed as may aromatic alcohols, such as benzyl alcohol, or cyclic alcohols.

While either acrylamide or methacrylamide is preferred for use in forming the interpolymer component, any unsaturated carboxylic acid amide can be employed. Such other amides include itaconic acid diamide, alpha-ethyl acrylamide, crotonamide, fumaric acid diamide, maleic acid diamide, and other amides of alpha, beta-ethylenically unsaturated carboxylic acids containing up to about 10 carbon atoms. Maleuric acid, and esters thereof, and imide derivatives such as N-carbamyl maleimide may also be utilized.

Any polymerizable monomeric compound containing at least one $CH_2=C<$ group, preferably in terminal position, may be polymerized with the unsaturated carboxylic acid amide. Examples of such monomers include:

(1) Monoolefinic and diolefinic hydrocarbons, that is, monomers containing only atoms of hydrogen and carbon, such as styrene, alpha-methyl styrene, alpha-ethyl styrene, alpha-butyl styrene, isobutylene (2-methyl propene-1), 2-methyl-butene-1, 2-methyl-pentene-1, 2,3-dimethyl-butene-1, 2,3-dimethyl-pentene-1, 2,4-dimethyl-pentene-1, 2,3,3,-trimethyl-butene-1, 2-methyl-heptene-1, 2,3-dimethyl-hexene-1, 2,4 - dimethyl - hexene-1, 2,5-dimethyl-hexene-1, 2-methyl-3-ethyl-pentene-1, 2,3,3-trimethyl-pentene-1, 2,3,4-trimethyl-pentene-1, 2-methyl-octene-1, 2,6-dimethyl-heptene-1, 2,6-dimethyl-octene-1, 2,3-dimethyl-decene-1, 2-methylnonadecene-1, ethylene, propylene, butylene, amylene, hexylene, butadiene-1,3, isoprene, and the like;

(2) Halogenated monoolefinic and diolefinic hydrocarbons, that is, monomers containing carbon, hydrogen and one or more halogen atoms, such as alpha-chlorostyrene, alpha-bromostyrene, 2,5-dichlorostyrene, 2,5-dibromostyrene, 3,4-dichlorostyrene, 3,4-difluorostyrene, ortho-, meta-, and para-fluorostyrenes, 2,6-dichlorostyrene, 2,6-difluorostyrene, 3-fluoro-4-chlorostyrene, 3-chloro-4-fluorostyrene, 2,4,5-trichlorostyrene, dichloromonofluorostyrenes, 2 - chloropropene, 2 - chlorobutene, 2-chloropentene, 2-chlorohexene, 2-chloroheptene, 2-bromobutene, 2-bromoheptene, 2-fluorohexene, 2-fluorobutene, 2-iodopropene, 2-iodopentene, 4-bromoheptene, 4-chloroheptene, 4-fluoroheptene, cis and trans-1,2-dichloroethylenes, 1,2-dibromoethylene, 1,2-difluoroethylene, 1,2-diiodoethylene, chloroethylene (vinyl chloride), 1,1-dichloroethylene (vinylidene chloride), bromoethylene, fluoroethylene, iodoethylene, 1,1-dibromoethylene, 1,1-fluoroethylene, 1,1-diiodoethylene, 1,1,2,2-tetrafluoroethylene, 1,1,2,2-tetrachloroethylene, 1-chloro-2,2,2-trifluoroethylene, chlorobutadiene and other halogenated diolefinic compounds;

(3) Esters of organic and inorganic acids, such as vinyl acetate, vinyl propionate, vinyl butyrate, vinyl isobutyrate, vinyl valerate, vinyl caproate, vinyl enanthate, vinyl benzoate, vinyl toluate, vinyl p-chlorobenzoate, vinyl o-chlorobenzoate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, and ethyl tiglate;

Methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate, and dodecyl acrylate;

Isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

Vinyl alpha-chloroacetate, vinyl alpha-bromoacetate, vinyl alpha-chloropropionate, vinyl alpha-bromopropionate, vinyl alpha-iodopropionate, vinyl alpha-chlorobutyrate, vinyl alpha-chlorovalerate and vinyl alpha-bromovalerate;

Allyl chloride, allyl cyanide, allyl bromide, allyl fluoride, allyl iodide, allyl chlorocarbonate, allyl nitrate, allyl thiocyanate, allyl formate, allyl acetate, allyl propionate, allyl butyrate, allyl valerate, allyl caproate, allyl 3,5,5-trimethyl-hexoate, allyl benzoate, allyl acrylate, allyl crotonate, allyl oleate, allyl chloroacetate, allyl trichloroacetate, allyl chloropropionate, allyl chlorovalerate, allyl lactate, allyl pyruvate, allyl aminoacetate, allyl acetoacetate, allyl thioacetate, as well as methallyl esters corresponding to the above allyl esters, as well as esters from such alkenyl alcohols as beta-ethyl allyl alcohol, beta-propyl allyl alcohols, 1-butene-4-ol, 2-methyl-butene-4-ol, 2(2,2-dimethyl-propyl)-1-butene-4-ol, and 1-pentene-4-ol;

Methyl alpha-chloroacrylate, methyl alpha-bromoacrylate, methyl alpha-fluoroacrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloracrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

Dimethyl maleate, diethyl maleate, diallyl maleate, dimethyl fumarate, diethyl fumarate, dimethallyl fumarate, and diethyl glutaconate;

(4) Organic nitriles, such as acrylonitrile, methacrylonitrile, ethacrylonitrile, 3-octenenitrile, crotonitrile, oleonitrile, and the like;

(5) Acid monomers, such as acrylic acid, methacrylic acid, crotonic acid, 3-butenoic acid, angelic acid, tiglic acid, and the like.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions.

The diazo compounds, such as p-methoxyphenyl diazothio-(2-naphthyl) ether, may also be used as polymerization catalysts in the preparation of amide interpolymers. Redox catalyst systems can also be employed.

The quantity of catalyst employed can be varied considerably; however, in most instances it is desirable to utilize from about 0.1 percent to 2.0 percent. If high viscosities are desired, a low initial level of catalyst, followed by the necessary additions to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of acrylamide with other ethylenically unsaturated monomers be relatively low in molecular weight so that they can be dissolved at high solids and low viscosities, a chain modifying agent or chain terminator is ordinarily added to the polymerization mixture. The use of a lower alkanol such as butanol or a mixture of butanol and water as a solvent, together with high catalyst levels, aids considerably, but in most instances it is preferred to add controlled amounts of chain modifying materials. The mercaptans, such as dodecyl mercaptan, tertiary dodecyl mercaptan, octyl mercaptan, hexyl mercaptan, and the like are conventionally used for this purpose. However, other chain modifying agents or "short stopping" agents such as cyclopentadiene, allyl acetate, allyl carbamate, alpha-methyl styrene, alpha-methyl styrene dimers, and the like can be used to secure low molecular weights, as can unsaturated fatty acids or esters.

The polymerization is best carried out by admixing the acrylamide, or other polymerizable amide, and the other monomer or monomers, the catalyst and chain modifying agent, if any, in the solvent, and refluxing the resulting solution for a time sufficient to obtain the desired conversion. Ordinarily, the polymerization will be complete in about 1 to 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization of the very rapid reaction rate and because the reaction is highly exothermic. Some control of the heat of reaction is obtained by adding the amide to the polymerization mixture incrementally. Good agitation is also desirable.

It is to be understood that the above polymerizable olefinic monomers are representative only, and do not include all of the $CH_2=C<$ containing monomers which may be employed.

Preferably, the interpolymer should contain from about 2 percent to about 50 percent by weight of the unsaturated carboxylic acid amide component, the balance being the other ethylenically unsaturated monomer(s). It has been found that those interpolymers containing the higher levels of the amide components with those monomers which oridinarily form hard polymers, give hard and flexible films, whereas interpolymers containing lower levels of the amide component with those monomers which ordinarily form soft homopolymers tend to be considerably softer. If more than one ethylenically unsaturated monomer is polymerized with the amide, the proportions of such addition monomers utilized will depend upon the characteristics which the monomer or monomers will impart to the final interpolymer.

The preparation of the amide interpolymer and the various other resins which may be blended therewith are described in detail in U.S. Patents 2,870,116; 2,870,117; 2,940,943; 2,940,944, and 2,940,945, the disclosures of which are incorporated herein by reference.

The amide interpolymer resin prepared according to the disclosures in the above-identified patents is reacted with an aldehyde, preferably in the presence of an alcohol. Formaldehyde in solution in water (formalin) or in an alkanol such as butanol, or a formaldehyde-yielding substance such as paraformaldehyde, trioxymethylene, or hexamethylenetetramine is greatly preferred. However, other aldehydes including acetaldehyde, butyraldehyde, furfural, and the like, preferably containing only atoms of carbon, hydrogen and oxygen, can be used. Dialdehydes such as glyoxal are preferably not employed, since they tend to cause the amide interpolymer resin to gel.

It is ordinarily preferred to utilize two equivalents of formaldehyde for each amide group present in the interpolymer, although this amount may be in considerable excess of the amount necessary to form methylol groups on the polymer chain. Accordingly, this ratio may be raised or lowered considerably if desired. For example, the ratio may be as high as 3.0 equivalents of formaldehyde for each amide group in the interpolymer, or as low as about 0.2 equivalent of formaldehyde for each amide group in the interpolymer.

The reaction is preferably carried out in the presence of a mild acid catalyst, such as maleic anhydride. Other acid catalysts, such as oxalic acid, hydrochloric acid, or sulfuric acid, may also be employed, although there is some possibility of gelation occurring if the acid catalyst is too strongly acidic. The quantity of catalyst utilized may be varied widely; for example, as pointed out hereinabove, the more acidic the reaction medium, the greater amount of etherification will occur.

The reaction of the amide interpolymer with the aldehyde can be carried out simply by adding the aldehyde and the catalyst (if one is utilized) to the polymerization mixture obtained by polymerizing the amide and one or more ethylenically unsaturated monomers and refluxing the resulting mixture for a period of from about 3 to about 5 hours until the desired viscosity is obtained. The water of condensation can be removed by azeotropic distillation, as may a portion of the solvent if desired. In fact, when the aldehyde is utilized in the form of a solution in an alkanol such as butanol, it is desirable that approximately half of the butanol be distilled off at the end of the reaction period and replaced by another solvent, such as xylol. It is preferred that the final resinous material have a solids content of about 20 percent to 70 percent.

Similar polymeric materials may also be obtained by first reacting the amide with an aldehyde, such as formaldehyde, to obtain an alkylolamide, for example, a methylolamide, and then polymerizing the methylolamide with one or more of the ethylenically unsaturated monomeric materials disclosed hereinabove. The polymerization utilizing a methylolamide is carried out in substantially the same manner as when the amide is interpolymerized with one or more monomers.

The polymeric materials may be prepared by still another route; namely, by polymerizing N-alkoxyalkyl amides, for example, N-butoxymethyl acrylamide, with one or more of the $CH_2=C<$ monomers set forth hereinabove. This method, described in copending application Serial No. 775,380 filed November 21, 1958, does not require reaction of the polymer with an aldehyde since the N-alkoxyalkyl amide monomers already contain —ROH or

groups, wherein R and $R_1$ have the meaning set forth above.

Regardless of the method by which the resinous material is obtained, it will contain in the polymer chain recurrent groups of the structure

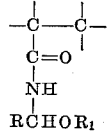

wherein R is hydrogen or a lower aliphatic hydrocarbon radical, and $R_1$ is hydrogen or the radical derived by removing the hydroxyl group from an alcohol. Thus, when the reaction is carried out in the presence of an alcohol, the alcohol reacts so that at least some, and preferably more than about 50 percent of the radicals $R_1$ will represent the radical derived from the alcohol. When the aldehyde is utilized alone, that is, not in an alcohol solution, the radical $R_1$, of course, will represent hydrogen. The free valences in the above structure may be satisfied with either hydrogen or hydrocarbon depending upon the amide which is utilized in the interpolymerization reaction.

Polyalkylene ethers which are to be employed with the present invention include any of the well known condensation or reaction products of polyols with alkylene oxides. Typical of the polyols which may be condensed to form the polyalkylene oxides are ethylene glycol, propylene glycol, trimethylol propane, butylene glycol, tetramethylene glycol, pentaerythritol, etc. Similarly, alkyene oxides such as ethylene oxide, propylene oxide, butylene oxide, amylene oxide, hexamethylene oxide, and the like may be used. Ethylene oxide-propylene oxide reaction products having varying degrees of oxyethylene content and varying molecular weights are commercially available under the trademark "Pluronics." Condensation polymers of trimethylol propane with propylene oxide sold under the trademark of "Pluracol" are particularly useful in the compositions of the instant invention. While polyalkylene ethers are more commonly found as products which have been initiated with hydroxyl containing compounds, the amine initiated class are found to be equally useful. The sequential addition of propylene and ethylene oxides to amines such as ethylene diamine produces a variety of compositions which can be employed advantageously with the instant invention. One source of these compositions is the "Tetronic" series.

The polyalkylene ethers, in general, may be employed in widely varying amounts since they are universally compatible with the said aldehyde-modified unsaturated carboxylic acid amide interpolymers. There is no particular advantage in utilizing amounts in excess of about 30 percent by weight of the total resins solids or less than about 2 percent by weight of the total resins solids. It is preferred, however, that the polyalkylene ethers be utilized in amounts of about 25 percent by weight or less.

As mentioned hereinabove, many of the aldehyde-modified unsaturated carboxylic acid amide interpolymers have been internally plasticized to a certain degree by polymerizing a softening monomer such as ethyl acrylate into the backbone of the polymer chain whereby only a minimum amount of the polyalkylene ether need be used to obtain extremely outstanding flexibility.

Another advantage to be obtained from the instant invention is that the polyalkylene ethers can be used to counteract any brittleness which is obtained through the additions of any other materials, such as catalysts, which are sometimes used to lower the curing temperatures of the said aldehyde-modified unsaturated carboxylic acid amide interpolymers. In many instances it is more feasible to add a catalyst which will lower the curing temperature rather than to build a new installation which will bake at a higher temperature. Moreover, where an additive is employed, such as a diisocyanate, with the aldehyde-modified unsaturated carboxylic acid amide interpolymers to impart air-drying and water resistant characteristics thereto, the resultant resinous composition is sometimes brittle and has poor impact resistance, washability and flexibility. This brittleness is readily overcome by the addition of various amounts of a polyalkylene ether.

Generally speaking, intermediate and high molecular weight polyalkylene ethers can be used most effectively to plasticize the said aldehyde-modified unsaturated carboxylic acid amide interpolymers, although the low molecular weight polyalkylene ethers may also be employed.

The functionality of the initiator (the polyol or the amine), that is, the number of hydroxyl groups or amine groups present on the initiator nucleus, roughly determines the minimum molecular weight which can be used and still obtain a significant plasticizing action. Where the only reactants are the alkylene oxides themselves, the reaction product is looked upon as being one which has been reacted with an alkylene glycol, and would be considered as having a functionality of two. As the functionality of the initiator increases, the minimum molecular weight of the polyalkylene ether, which can be employed successfully as a plasticizer, increases. Where the initiator is a diol, it is possible to have the molecular weight extend downwardly to a value of 500 or even lower, whereas the minimum molecular weight for a tetrafunctional polyol condensation product would be in the range of about 800 to 1000.

As previously mentioned, ethylene oxide may be employed as one of the alkylene oxides. In many instances, high oxyethylene contents may be considered useful for plasticizing the afore-mentioned aldehyde-modified unsaturated carboxylic acid amide interpolymers, but it is preferred that the oxyethylene content be no higher than about 50 percent. The oxyethylene content of these condensation products has a substantial bearing on whether or not they are hydrophilic or hydrophobic, and it may, therefore, be desirable to adjust the properties accordingly by adjusting the oxyethylene content.

The polyoxypropylene derivatives of trimethylol-propane are defined by the following formula with the properties of the commercially available derivatives being set forth in Table I.

(I)
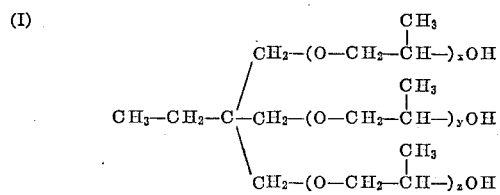

In the foregoing formula, $x$, $y$, and $z$ are whole numbers which are approximately equal for any given molecular weight.

TABLE I

| Pluracol | 740 | 1,540 | 2,540 | 4,040 |
|---|---|---|---|---|
| Molecular weight | 732 | 1,535 | 2,670 | 4,100 |
| Form | (¹) | (¹) | (¹) | (¹) |
| Hydroxyl number, KOH/g | 230 | 110 | 53 | 41 |
| Apparent pH, 10 g. in 60 cc. of 10:1 methanol-water | 7 | 7 | 7 | 7 |
| Water, percent | 0.1 | 0.1 | 0.1 | 0.1 |
| Unsaturation, meq./g | 0.005 | 0.02 | 0.04 | 0.08 |
| Volatiles, percent by weight | 0.1 | 0.1 | 0.05 | 0.05 |
| Potassium plus sodium, p.p.m | <10 | <10 | <10 | <10 |
| Acid number | 0.03 | 0.04 | 0.02 | 0.02 |
| Viscosity at 25° C., c.p.s | 325 | 290 | 440 | 670 |

¹ Liquid.

The propylene oxide-ethylene oxide condensation products of ethylenediamine are depicted structurally in the following formula:

(II)
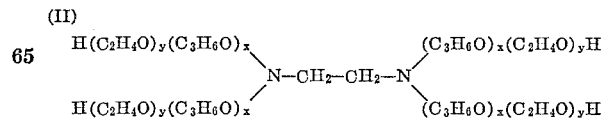

In Formula II the letters $x$ and $y$ represent whole numbers which may be the same or different, depending on the amounts of ethylene oxide and propylene oxide utilized. Various commercially available reaction products under the trademark "Tetronics" represented by Formula II, which may be used in preparing the compositions of the instant invention, are set forth in the following table.

TABLE II

| Molecular Weight | 1,501-2,000 | 2,501-3,000 | 2,501-3,000 | 2,501-3,000 | 2,501-3,000 | 3,601-4,500 | 3,601-4,500 |
|---|---|---|---|---|---|---|---|
| Oxyethylene Content (Percent) | 40-49 | 10-19 | 20-29 | 40-49 | 70-79 | 40-49 | 80-89 |
| Form | (1) | (1) | (1) | (1) | (2) | (3) | (2) |
| Specific Gravity, 25/25° C | 1.04 | 1.02 | 1.03 | 1.04 | | 1.04 | |
| Viscosity at 25° C., c.p.s. | 800 | 575 | 770 | 850 | | | |
| Pour Point, ° C | 7 | -21 | -7 | 18 | | | |
| Melting Point, ° C | | | | | 49 | 29 | 58 |

1 Liquid.
2 Flake.
3 Paste.

Various ethylene oxide-propylene oxide condensation products having molecular weights ranging from 800 to 2,500 and containing oxyethylene units in amounts up to 70 percent of the total molecule may be used.

The following examples illustrate in detail the preparation of the compositions of the instant invention. They are given by way of illustration and not by way of limitation. All parts and percentages are by weight unless otherwise specified.

Example I

| | Parts by weight |
|---|---|
| Acrylamide | 15 |
| Styrene | 82.5 |
| Methacrylic acid | 2.5 |
| Butanol | 50 |
| Toluene | 50 |

The above ingredients were mixed in the presence of cumene hydroperoxide (1 part) and tertiary dodecyl mercaptan (2 parts) and refluxed for 2 hours. More cumene hydroperoxide (0.5 part) was added to the reaction mixture and the reaction mixture was refluxed for 2 more hours, after which butyl Formcel (31.7 parts), maleic anhydride (3.8 parts) and cumene hydroperoxide (0.5 part) were added to the reaction mass. Azeotropic distillation was then carried out for three 2-hour intervals after the first two of which cumene hydroperoxide (0.5 part) was added to the reaction mass. After the last azeotropic distillation period, an epoxy resin (12.5 parts Epon 1001, epoxide equivalent 450 to 525) and toluene (12.5 parts) were added and the reaction mass was then held at a temperature within the range of 80° C. to 110° C. until the epoxide resin was completely dissolved. The resinous composition had the following properties:

| | |
|---|---|
| Solids (percent) | 50 |
| Viscosity (Gardner-Holdt) | U |
| Acid value | 7.0 |

Example II

| | Parts by weight |
|---|---|
| Acrylamide | 15 |
| Styrene | 38.5 |
| Methyl methacrylate | 44 |
| Methacrylic acid | 2.5 |
| Butanol | 50 |
| Toluene | 50 |

The above ingredients were mixed in the presence of cumene hydroperoxide (1 part) and tertiary dodecyl mercaptan (3 parts) and refluxed for 2 hours. More cumene hydroperoxide (0.5 part) was added to the reaction mixture which was refluxed for another 2 hour period after which butyl Formcel (31.7 parts), maleic anhydride (3.8 parts) and cumene hydroperoxide (0.5 part) were added. The mixture was then azeotropically distilled for three 2-hour intervals with additional cumene hydroperoxide (0.5 part) being added prior to the last two 2-hour azeotropic distillations. The resulting product had the following properties:

| | |
|---|---|
| Solids (percent) | 50 |
| Viscosity (Gardner-Holdt) | X |
| Acid value | 7.6 |

Example III

| | Parts by weight |
|---|---|
| Acrylamide | 15 |
| Styrene | 82.5 |
| Methacrylic acid | 2.5 |
| Butanol | 50 |

The above ingredients were mixed in the presence of cumene hydroperoxide (1 part) and tertiary dodecyl mercaptan (2 parts) and refluxed for 2 hours. The reaction mixture was then refluxed for 2 more two-hour intervals with more cumene hydroperoxide (0.5 part) being added prior to each interval. After the last interval, butyl Formcel (31.7 parts), maleic anhydride (3.8 parts), cumene hydroperoxide (0.5 part) and toluene (16.3 parts) were added. The reaction mixture was then azeotropically distilled for 3 two-hour periods with additions of cumene hydroperoxide (0.5 part) being made after the first 2 two-hour intervals. After the last two-hour azeotropic distillations, more toluene (33.7 parts) was added to the reaction mixture. The resinous composition had the following properties:

| | |
|---|---|
| Solids (percent) | 50 |
| Viscosity (Gardner-Holdt) | V |
| Acid value | 7.5 |

Example IV

An acrylamide interpolymer is prepared from the following proponents in the amounts set forth:

| | Parts by weight |
|---|---|
| Acrylamide | 90 |
| Styrene | 231 |
| Ethyl acrylate | 264 |
| Methacrylic acid | 15 |
| Butanol | 300 |
| Toluene | 300 |

The above components were mixed in a solution and refluxed in the presence of cumene hydroperoxide (9 parts) and tertiary dodecyl mercaptan (9 parts) for 2 hours at 210° F. to 215° F., after which was added cumene hydroperoxide (3.0 parts). The mixture was then refluxed for three successive 2-hour intervals after each of which additions of cumene hydroperoxide (3.0 parts) were made. After the second reflux period, butyl Formcel (190.5 parts) and maleic anhydride (2.6 parts) were also added. During the last two reflux periods, the formed water was removed by azeotropic distillation. The resulting resinous product had the following properties:

| | |
|---|---|
| Solids (percent) | 50 |
| Viscosity (Gardner-Holdt) | U-W |

The resinous product (90 parts) was then cooled to about 175° F. and was blended with 10 parts of an epoxy resin (epoxide equivalent 450-525) with additional solvent based on the weight of the total mixture. This blend was stirred until it was homogeneous and cooled. The resulting resinous composition had a percent solids content of 50.

The following Table III sets forth the plasticizing effect of the various polyalkylene ethers on the unpigmented aldehyde-modified unsaturated carboxylic acid amide interpolymers coatings, films of which were drawn down on steel panels and baked for 30 minutes at 300° F. The flexibility of the films was tested on a conical mandrel and the direct and indirect impacts were tested by dropping a one-pound ball from various heights to 80 inches and observing the height at which the coating becomes ruptured or loses its adhesion to the steel plate. The obbreviations used in the following Table III have the following meanings:

TMP—trimethylolpropane
EO—ethylene oxide
PO—propylene oxide

The above ingredients were charged into a pebble mill and ground for 16 hours, after which 75 parts of the urea-formaldehyde and 95 parts of the Araldite 7097 solution were added as "let down" to the pebble mill until homogeneity was obtained.

*Example VII*

A urea-formaldehyde phenol formaldehyde primer composition was prepared as follows:

| | Parts by weight |
|---|---|
| Urea-formaldehyde resin | 40 |
| Phenol formaldehyde resin | 60 |
| Epoxy resin solution (Shell Epon 1007, 33 parts diacetone, 16.5 parts high boiling naphtha, Solvesso 100 and 33 parts Epon 1007) | 385 |
| Diacetone | 165 |

TABLE III

| Composition | Molecular Weight of Polyalkylene Ether | Flexibility (Percent) | Indirect Impact in Inch Lbs. | Direct Impact in Inch Lbs. |
|---|---|---|---|---|
| Product of Example I plus 25% TMP-PO Polyether (Pluracol TP-740) | 732 | 20 | | |
| Product of Example III plus 25% TMP-PO Polyether (Pluracol TP-740) | 732 | 20 | 40-48 | 40-60 |
| Product of Example II plus 25% TMP-PO Polyether (Pluracol TP-740) | 732 | 20 | | 20-30 |
| Product of Example I plus 25% TMP-PO Polyether (Pluracol TP-2540) | 2,670 | 20 | | 30-40 |
| Product of Example III plus 25% TMP-PO Polyether (Pluracol TP-2540) | 2,670 | 20 | 80+ | 80+ |
| Product of Example II plus 25% TMP-PO Polyether (Pluracol TP-2540) | 2,670 | 20 | 80+ | 80+ |
| Product of Example III plus 25% TMP-PO Polyether (Pluracol TP-4040) | 4,100 | 20 | 80+ | 80+ |
| Product of Example II plus 25% TMP-PO Polyether (Pluracol TP-4040) | 4,100 | 20 | | 20-30 |
| Product of Example I plus 25% Glycerin-PO Polyether (G-700 Jefferson Chemical Company) | 700 | 20 | | 20-30 |
| Product of Example I plus 25% Glycerin-PO-EO Polyether (Polyglycol 15-100) | 1,100 | 20 | | 20-30 |
| Product of Example I plus 25% EO-PO-EO Polyether (Pluronic L-63) | 1,500-1,800 | 20 | 6-10 | 40-48 |
| Product of Example I plus 25% EO-PO-EO Polyether (40% Oxyethylene Content Pluronic P-84) | 2,100-2,500 | 20 | 80+ | 80+ |
| Product of Example I plus 25% Polypropylene Glycol | 2,025 | 20 | | 30-40 |
| Product of Example I plus 25% Ethylene Diamine EO-PO Polyether (40-49% Oxyethylene Content; Tetronic 704) | 2,501-3,000 | 20 | 80+ | 80+ |
| Product of Example I plus 25% Poly-1,4-Butylene Glycol Polyether (Polyglycol B-500) | 500 | 20 | | 20-30 |
| Product of Example I plus 25% Poly-1,4-Butylene Glycol Polyether (Polyglycol B-1000) | 1,000 | 20 | | |
| Product of Example I | | 0 | 3 | 10-20 |
| Product of Example II | | 0 | 3 | 10-20 |
| Product of Example III | | 0 | 3 | 10-20 |

*Example V*

A pigment paste was made up as follows:

| | Parts by weight |
|---|---|
| Product of Example I | 25 |
| Polyethylene (20 percent dispersion of polyethylene, Semet Solvay AC-629, inxylene) | 15 |
| Pine oil | 29 |
| Reoderant (Maskit) | 1 |
| High boiling aromatic hydrocarbon solvent, boiling point 340° F. to 550° F. (Velsicol 45) | 20 |
| Titanium dioxide pigment (rutile) | 265 |

The above ingredients were charged into a pebble mill and ground for sixteen hours, after which 45 parts of the resinous product of Example I were added as "let down" to the pebble mill and ground until homogeneity was obtained.

*Example VI*

A pigment paste was prepared as follows:

| | Parts by weight |
|---|---|
| Urea-formaldehyde resin | 75 |
| Araldite 7097 (solution containing 33 parts diacetone, 165 parts Solvesso 100 high boiling naphtha and 33 parts Araldite 7097, polyglycidyl ether of bisphenol A) | 260 |
| Titanium dioxide pigment (non-chalking rutile) | 970 |

The above ingredients were blended and a mixture comprising pigment paste of Example VI (320 parts), black tint (3 parts) and 2 percent silicone oil solution in xylene, Linde R-12, (0.5 part) was added thereto.

*Example VIII*

An enamel was prepared using the product of Example I as follows:

| | Parts by weight |
|---|---|
| Suspending agent (10 percent alkyl ammonium montmorillonite in xylene; containing 3.83 percent methanol, Bentone gel) | 30 |
| Magnesium silicate pigment (talc) | 15 |
| Product of Example I | 100 |

The above components were blended in a Cowles dissolver. The following composition was then admixed and blended with the above ingredients.

| | Parts by weight |
|---|---|
| Product of Example I | 260 |
| Propylene oxide-trimethyl propane reaction product (Pluracol TP-2540) | 55 |
| Butyl carbitol | 15 |
| High boiling aromatic hydrocarbon solvent, boiling point 340° F. to 550° F. (Velsicol 45) | 40 |
| Xylene | 55 |
| 1.4 percent solution reoderant (Maskit) in xylene solution | 15 |
| 2 percent silicone oil in xylene (Linde R-12) | 2 |

The pigment paste of Example V (430 parts) was blended with the above admixed components.

*Example IX*

A pigment paste was prepared as follows:

| | Parts by weight |
|---|---|
| Product of Example IV | 30 |
| Xylene | 60 |
| Polyethylene (20 percent dispersion of polyethylene, Semet Solvay AC-629, in xylene) | 15 |
| Titanium dioxide pigment (rutile) | 280 |

The above ingredients were charged into a pebble mill and ground for 16 hours after which 75 parts of the product of Example IV were added as "let down." The composition was then ground until homogeneity was obtained.

*Example X*

An enamel was prepared using the resinous composition of Example IV as follows:

| | Parts by weight |
|---|---|
| Product of Example IV | 495 |
| Pine oil | 10 |
| Silicone oil, 2 percent solution in xylene (Linde R-12) | 2 |
| 1.4 percent solution of reoderant in xylene solvent (Maskit) | 33 |
| Pigment paste of Example IX | 460 |
| Butyl carbitol | 15 |

The above ingredients were admixed until homogeneity was obtained.

The following table (Table IV) illustrates, by comparison, the effect that polyalkylene ethers (Pluracol TP-2540) have on the relatively brittle and hard aldehyde-modified unsaturated carboxylic acid amide interpolymer enamel composition of Example VIII. The brittle and hard aldehyde-modified interpolymer was tested with and without 20 percent by weight of a product defined by Formula I (Pluracol 2540) and having a molecular weight of 2532; and a third coating made from one of the aforementioned unsaturated carboxylic acid amide interpolymer aldehyde condensation products which contains a substantial amount of a plasticizing monomer interpolymerized therein was also tested and compared. The data of Table IV were obtained by testing steel panels which were first coated with the phenol formaldehyde, urea-formaldehyde primer of Example VII and baked for 30 minutes at 250° F. The primer panels were then sprayed with the three different compositions to be used for comparison and baked for 15 minutes at 400° F.

TABLE IV

| | Flexibility | Direct Impact | Indirect Impact |
|---|---|---|---|
| Enamel of Example VIII plus 20% Pluracol. | Very Good | Excellent | Good. |
| Enamel of Example X | do | do | Do. |
| Enamel of Example VIII | Poor | Fair | Extremely Poor. |

Thus, while specific examples of the invention have been set forth hereinabove, it is not intended that the invention be limited solely thereto, but to include all of the variations and modifications falling within the scope of the appended claims.

We claim:

1. A composition comprising (1) an interpolymer of a polymerizable unsaturated carboxylic acid amide and at least one other monomer containing a $CH_2=C<$ group, said interpolymer containing from about 2 percent to about 50 percent by weight of said amide and being characterized by having amido hydrogen atoms replaced by the structure $$-\overset{R}{\underset{|}{C}}HOR_1$$

wherein R is a member of the class consisting of hydrogen and lower aliphatic hydrocarbon radicals and $R_1$ is a member of the class consisting of hydrogen and a radical derived by removing the hydroxyl group from a monohydric alcohol, and (2) from about 2 percent to about 30 percent by weight based on the total resin solids of a carbonyl free polyalkylene ether of a compound containing at least one member of the group consisting of hydroxyl radicals and amine radicals, said polyalkylene ether having a molecular weight between about 500 and about 4500.

2. The composition of claim 1 in which said polyalkylene ether is a reaction product of propylene oxide and trimethylol propane, having a molecular weight between about 732 and about 4100.

3. The composition of claim 1 in which said polyalkylene ether is a reaction product of ethylene oxide, propylene oxide and ethylene diamine, having a molecular weight between about 1500 and about 4500 and an oxyethylene content between about 10 percent and about 89 percent.

4. The composition of claim 1 in which said polyalkylene ether is a reaction product of ethylene oxide and propylene oxide, having a molecular weight between about 800 and about 2500 and an oxyethylene content of up to about 70 percent.

5. A composition comprising (1) an interpolymer of acrylamide and at least one other monomer containing a $CH_2=C<$ group, said interpolymer containing from about 2 percent to about 50 percent by weight of said acrylamide and being characterized by having amido hydrogen atoms replaced by the structure $$-CH_2OR_1$$

where $R_1$ is a member of the class consisting of hydrogen and a lower alkyl radical and (2) from about 2 percent to about 30 percent by weight based on the total resin solids of a carbonyl free polyalkylene ether of a compound containing at least one member of the group consisting of hydroxyl radicals and amine radicals, said polyalkylene ether having a molecular weight between about 500 and about 4500.

6. The composition of claim 1 wherein the polyalkylene ether is poly-1,4-butylene glycol.

7. The composition of claim 1 wherein the polyalkylene ether is the reaction product of glycerin and propylene oxide.

8. The composition of claim 5 wherein the interpolymer is an interpolymer of acrylamide and styrene.

9. The composition of claim 5 wherein the interpolymer is an interpolymer of acrylamide, methyl methacrylate, styrene and methacrylic acid.

10. The composition of claim 5 wherein the interpolymer is an interpolymer of acrylamide, styrene, and methacrylic acid.

References Cited by the Examiner

UNITED STATES PATENTS

| 2,527,970 | 10/1950 | Sokol | 260—33.2 |
| 2,955,055 | 10/1960 | Souder et al. | 260—80.5 |
| 2,962,462 | 11/1960 | Chapin et al. | 260—80.5 |
| 3,037,963 | 6/1962 | Christenson | 260—80.5 |

MORRIS LIEBMAN, *Primary Examiner.*

S. ASTOR, D. C. KOLASCH, B. A. AMERNICK,
*Assistant Examiners.*